March 6, 1962  L. J. WOJTKOWIAK  3,023,531

FISHING DEVICE

Filed Feb. 12, 1960  3 Sheets-Sheet 1

INVENTOR.
LEO J. WOJTKOWIAK
BY Joseph G. Martin
ATTORNEY

March 6, 1962 L. J. WOJTKOWIAK 3,023,531
FISHING DEVICE

Filed Feb. 12, 1960 3 Sheets-Sheet 2

INVENTOR.
LEO J. WOJTKOWIAK
BY
Adolph G. Martin
ATTORNEY

March 6, 1962 L. J. WOJTKOWIAK 3,023,531
FISHING DEVICE

Filed Feb. 12, 1960 3 Sheets-Sheet 3

INVENTOR.
LEO J. WOJTKOWIAK
BY
*Joseph G. Martin*
ATTORNEY

United States Patent Office 3,023,531
Patented Mar. 6, 1962

3,023,531
FISHING DEVICE
Leo J. Wojtkowiak, 2271 10th St., Wyandotte, Mich.
Filed Feb. 12, 1960, Ser. No. 8,455
3 Claims. (Cl. 43—16)

This invention relates to fishing devices generally, and more particularly to a rod which can automatically produce a counter pull on a fishing line in response to an initiating pull of pre-determined magnitude on such line.

It is common practice among fishermen generally, whenever the type of fishing and circumstances will permit, to use more than one rod. As a consequence of this practice, some of the fishing rods are usually unattended during a portion of the time they are in use. This is especially true in the instance of ice fishing, where the line openings are usually quite widely spaced.

Because of the large amount of time consumed in traveling between openings in the ice, fishermen are seldom present to manipulate the line when a fish is active at the bait. As a result, in this type of fishing, large numbers of fish are able successfully to take bait without being securely hooked. Fully cognizant of this shortcoming in fishing with unattended lines, the applicant has, as the primary object of this invention, the provision of a rod which will automatically exert a counter pull on a fishing line in response to a pull at the bait.

Another object of the invention is to provide a fishing device of the type previously described, which provides a positive and readily discernable signal when a pull of pre-determined magnitude has been exerted on the fishing line.

A further object of the invention is to provide a device of the type previously described, which can be readily adjusted to exert a uniform preselected drag on the fishing line.

Still another object of the invention is to provide a device of the type previously described, which is conveniently portable and capable of storing an adequate supply of fishing line.

Yet another object of the invention is the provision of a device of the type previously described, which is strongly constructed, extremely simple to operate, and capable of withstanding the corroding effects of the natural elements.

Other objects and features of the invention will become increasingly apparent upon consideration of the detailed discussion of the same which follows, composed with reference to the drawings constituting a portion of the specification, and in which.

Figure 1:
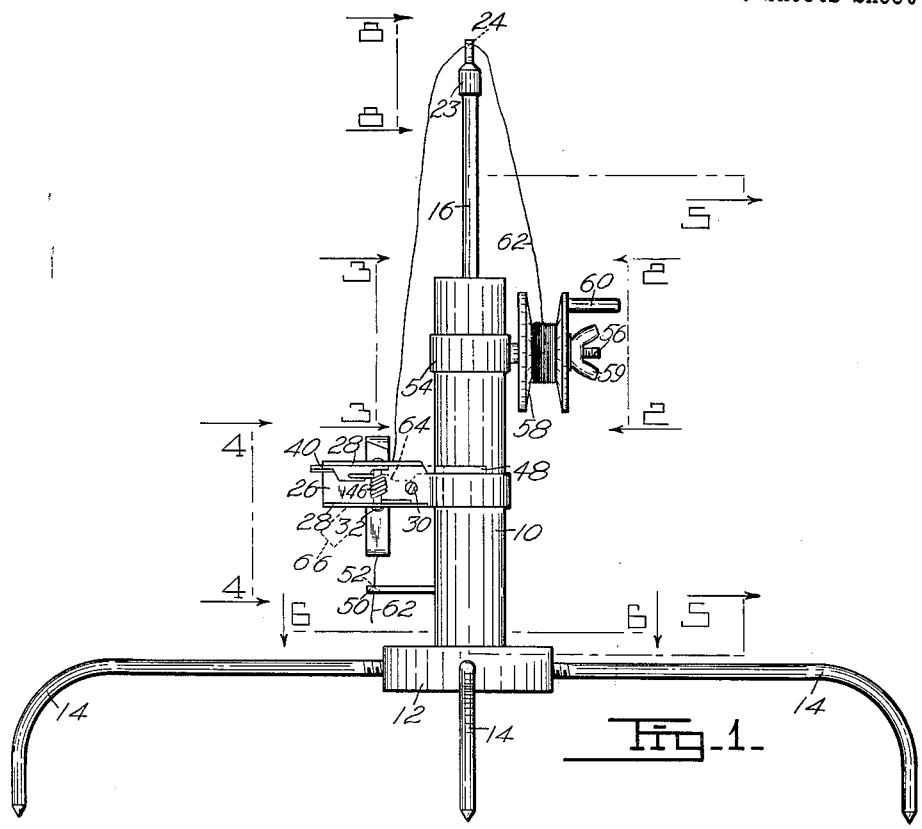
FIGURE 1 is an elevation view of the device constituting the applicant's invention showing such device in an unset condition.
Figure 2:
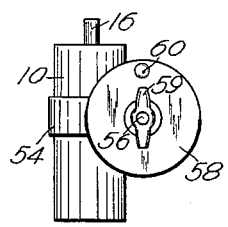
FIGURE 2 is an elevation view taken substantially on plane 2—2 in FIGURE 1 showing the adjustment nut and operator knob on the reel.
Figure 3:
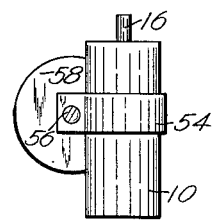
FIGURE 3 is an elevation view taken substantially on plane 3—3 in FIGURE 1 showing attachment of the reel to the tubular post.
Figure 4:
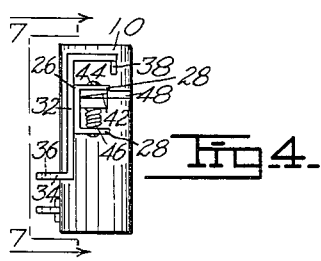
FIGURE 4 is an elevation view taken substantially on plane 4—4 in FIGURE 1 showing structural details of the trigger and catch.
Figure 5:
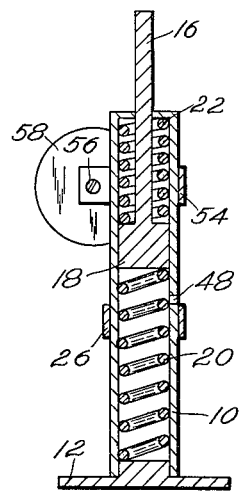
FIGURE 5 is a section view taken substantially on plane 5—5 in FIGURE 1 showing the plunger and related components in the tubular post.
Figure 6:
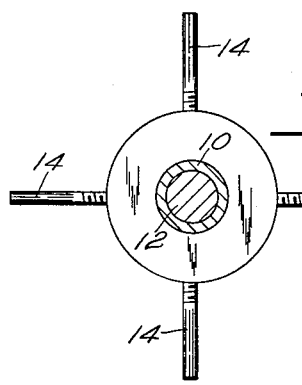
FIGURE 6 is a section view taken substantially on plane 6—6 in FIGURE 1, showing the hub and support legs attached to the tubular post.
Figure 7:
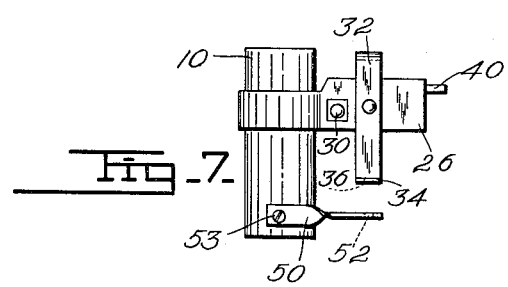
FIGURE 7 is an elevation view taken substantially on plane 7—7 in FIGURE 4 showing structural details of the trigger and the line guide supported on the tubular post.
Figure 8:
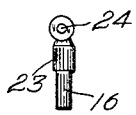
FIGURE 8 is an elevation view taken substantially on plane 8—8 in FIGURE 1 showing the line guide on the plunger tip.
Figure 9:
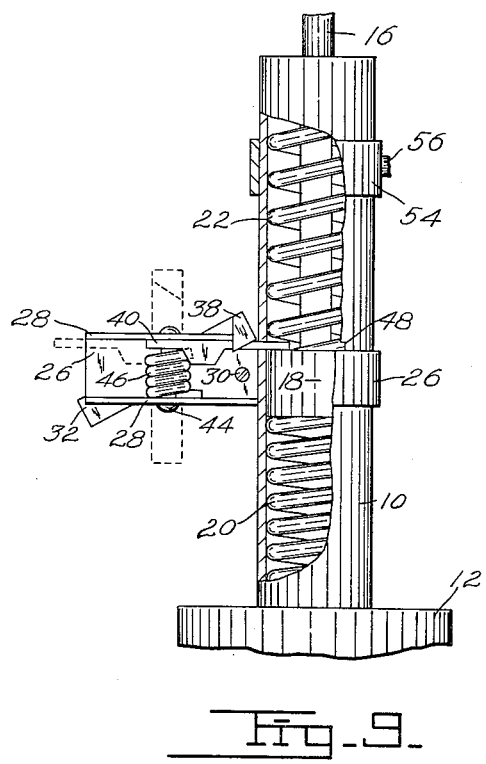
FIGURE 9 is an enlarged front elevation view showing the applicant's device in a set position, with portions of the tubular post and its associated components broken away.

For a detailed discussion of the invention, reference is made to the drawings in which numeral 10 designates a tubular post having at the lower end thereof a hub 12. Four spaced downwardly disposed legs 14, sharpened at the free end, are detachably mounted in the hub 12. A plunger 16, slidably mounted in the tubular post 10, has a piston 18 on the lower end. A coil spring 20 is interposed between the bottom of the piston 18 and the hub 12. A compression or cushion spring 22 encloses the plunger 16 between the top of the piston 18 and the upper end of the tubular post 10.

A line guide 23, having therein an opening 24, is fixed on the upper end of the plunger 16. A bracket 26, having two spaced lateral flanges 28, is secured to the tubular post 10 by a screw 30. A trigger 32 is pivoted on the bracket 26 for limited rotation in a vertical plane.

An angular guide 34, formed on the lower end of the trigger 32, has therethrough an opening 36. A downwardly disposed triangular finger 38 is formed on the upper end of the trigger 32. A catch 40, having a tapered face 42, is pivotally attached to the bracket 26 by a rivet 44 for 180 degree rotation between the two lateral flanges 28.

A coil spring 46 on the rivet 44 yieldably holds the catch 40 to the retracted or full line position shown in FIGURE 1. A transverse slot 48 in the tubular post is disposed in lateral alignment with the catch 40. A line guide 50, having an opening 52 therein, is disposed below the trigger 32 and attached to the tubular post 10 by a screw 53. A strap 54 is adjustably held on the upper portion of the tubular post 10 by a screw 56. A reel 58 is rotatably supported on the screw 56, and retained thereon by a drag adjusting wing nut 59.

An operator knob 60 is pivotally mounted on the outer side of the reel 58. A supply of line 62 is wound on the reel 58, and threaded successively through the guide openings 24, 36, and 52 in guides 23, 34, and 50 respectively. An appropriate lure or bait, not here shown is attachable to the free end of the line 62 to prepare the device for use. In practice, it is desirable to fabricate all structural components for the applicant's fishing device from corrosion resistant materials such as aluminum. It is also desirable to apply a bright color to the upper end of the plunger so as to render it more easily visible from a distance.

The previous discussion completes a detailed description of the structure characterizing the preferred embodiment of the applicant's invention; however, to provide a more thorough understanding of the subject matter herein presented, a brief discussion will be directed to the manner in which the fishing device operates in performing its intended function.

In use, the applicant's device is first set by depressing the plunger 16 until the upper surface of the piston 18 is laterally aligned with the lower edge of the transverse slot 48 in the tubular post 10. The catch 40 is then rotated to the broken line position 64 in FIGURE 1, so that the tapered face 42 thereon overlays the piston 18. The trigger 32 is next pivoted in a clockwise direction to the broken line position 66 shown in FIGURE 1 where the triangular finger 38 engages the outer face of the catch 40. The device is then placed over a suitable opening in the ice, not here shown, and the line 62 dropped into the water.

The reel 58 is next unwound so as to provide the requisite length of line, and the wing nut 59 thereon adjusted to produce the desired amount of drag. When a downward pull of sufficient magnitude is applied to the lower end of the line 62, the trigger 32 is rotated in a counter-clockwise direction until the triangular finger 38 is raised sufficiently to release the catch 40. The coil spring 46 thereupon moves the catch 40 toward the full line position shown in FIGURE 1, thus releasing the piston 18 which moves upward in the tubular post 10 carrying the plunger 16 to its upper limit of travel.

This movement of the plunger 16 produces a sudden upward pull on the line 62 so as to hook the fish that exerted the initiating downward pull on the line 62. In event the fish has been secured, and exerts a sufficient downward pull on the line 62 to overcome the pre-set drag on the reel 58, it will turn slowly so as to release additional line 62. Yieldable resistance to the downward pull on the line is also produced by the coil spring 20 under the piston 18 which will compress in response to such downward pull on the line 62.

Based upon the foregoing discussion, the applicant is of the opinion that his invention has fulfilled a long felt need in the field of fishing devices, and that he has accordingly made a valuable contribution to the related art. However, while the invention was described with reference to the structural details of a single embodiment, it will be understood by those skilled in the art that the principles involved are susceptible of numerous other practical applications.

Therefore, I claim as new, and desire to secure by Letters Patent:

1. A fishing device for supporting a line comprising a tubular post, a plunger projecting axially from the tubular post and supported therein for travel between an extended and a retracted position, resilient means yieldably holding the plunger in its extended position, there being a slot in the tubular post, a catch pivotally supported by the post, such catch being movable through the slot and into contact with the plunger so as to hold said plunger in the retracted position, resilient means yieldably holding the catch out of contact with the plunger, a trigger pivotally supported by the post and settable to hold the catch in contact with the plunger, and guide means on the trigger and plunger for receiving the line, such trigger means being actuated by a pull of pre-determined magnitude on the line so as to release the catch thereby permitting the plunger to move to its extended position.

2. A fishing device for supporting a line comprising a tubular post, a piston in the tubular post, a plunger on the piston projecting axially from the tubular post for travel between an extended and a retracted position, resilient means yieldably holding the plunger in its extended position, there being a slot in the tubular post, a catch pivotally supported by the post, such catch being movable through the slot so as to overlay the piston and thereby hold the plunger in the retracted position, resilient means yieldably holding the catch out of contact with the plunger, a trigger pivotally supported by the post and settable to hold the catch in contact with the plunger, and guide means on the trigger and plunger for receiving the line, such trigger means being pivoted by a pull of pre-determined magnitude on the line so as to release the catch thereby permitting the plunger to move to its extended position.

3. A fishing device for supporting a line comprising a tubular post, means on the post for supporting the same in an upright position, a piston in the tubular post, a plunger on the piston projecting axially from the tubular post for travel between an extended and a retracted position, resilient means yieldably holding the plunger in its extended position, there being a slot in the tubular post, a catch pivotally supported by the post, such catch being movable through the slot so as to overlay the piston and thereby hold the plunger in its retracted position, resilient means yieldably holding the catch out of contact with the plunger, a trigger pivotally supported by the post and settable to hold the catch in contact with the plunger, means on the post for storing line, guide means on the trigger and plunger for receiving the line, such trigger means being pivoted by a pull of pre-determined magnitude on the line so as to release the catch thereby permitting the plunger to move to its extended position, and resilient means in the tubular post above the piston to cushion movement of the plunger as it travels to its extended position.

References Cited in the file of this patent

UNITED STATES PATENTS

| 203,109 | Boyers | Apr. 30, 1878 |
| 2,694,875 | Hoffmann | Nov. 23, 1954 |
| 2,784,517 | Mooney | Mar. 12, 1957 |

FOREIGN PATENTS

| 501,968 | Italy | Nov. 26, 1954 |
| 924,547 | France | Mar. 10, 1947 |